(12) United States Patent
Hynes et al.

(10) Patent No.: US 11,726,281 B2
(45) Date of Patent: Aug. 15, 2023

(54) FIBER OPTIC CABLE ASSEMBLY WITH A TRACER COMPONENT

(71) Applicant: COMMSCOPE TECHNOLOGIES LLC, Hickory, NC (US)

(72) Inventors: Joseph M. Hynes, Huntington Beach, CA (US); Paul T. Alvarez, Costa Mesa, CA (US); Yvette Gonzalez, Irvine, CA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/294,208

(22) PCT Filed: Nov. 15, 2019

(86) PCT No.: PCT/US2019/061801
§ 371 (c)(1),
(2) Date: May 14, 2021

(87) PCT Pub. No.: WO2020/102720
PCT Pub. Date: May 22, 2020

(65) Prior Publication Data
US 2022/0003947 A1    Jan. 6, 2022

Related U.S. Application Data

(60) Provisional application No. 62/768,594, filed on Nov. 16, 2018.

(51) Int. Cl.
*G02B 6/42* (2006.01)
*G02B 6/38* (2006.01)

(52) U.S. Cl.
CPC ......... *G02B 6/4278* (2013.01); *G02B 6/3849* (2013.01); *G02B 6/3895* (2013.01)

(58) Field of Classification Search
CPC .......... G02B 6/42; G02B 6/38; G02B 6/4278; G02B 6/3849; G02B 6/3895
See application file for complete search history.

(56) References Cited

U.S. PATENT DOCUMENTS

| 5,305,405 | A | 4/1994 | Emmons et al. |
| 7,572,066 | B2 | 8/2009 | de Jong et al. |
| 8,314,603 | B2 | 11/2012 | Russell |
| 9,946,038 | B1 * | 4/2018 | Lin ..................... G02B 6/3817 |

(Continued)

FOREIGN PATENT DOCUMENTS

CN        206757105 U      12/2017

OTHER PUBLICATIONS

International Search Report and Written Opinion of the International Searching Authority for International Patent Application No. PCT/US2019/061801 dated Mar. 11, 2020, 12 pages.

*Primary Examiner* — Tina M Wong
(74) *Attorney, Agent, or Firm* — Merchant & Gould P.C.

(57) ABSTRACT

A cable assembly including a tracer conduit and one or more data transmission conduits. Physically separable proximal and/or distal portions of the data transmission conduit(s) and the tracer conduit are held together by a sleeve. In some examples the sleeve is axially and radially expandable and collapsible multiple times. In some examples, the tracer conduit transmits a visible laser light signal that can be observed after it radially diffuses through the sleeve.

21 Claims, 6 Drawing Sheets

(56) References Cited

U.S. PATENT DOCUMENTS

| | | | |
|---|---|---|---|
| 11,333,815 B1* | 5/2022 | Ko | G02B 6/4204 |
| 2009/0022459 A1 | 1/2009 | Lu et al. | |
| 2010/0150504 A1 | 6/2010 | Allen et al. | |
| 2011/0034068 A1* | 2/2011 | Russell | G02B 6/4416 439/502 |
| 2018/0136399 A1 | 5/2018 | Bauco et al. | |
| 2022/0003947 A1* | 1/2022 | Hynes | G02B 6/3895 |

* cited by examiner

FIBER OPTIC CABLE ASSEMBLY WITH A TRACER COMPONENT

CROSS-REFERENCE TO RELATED APPLICATION

This application is being filed on Nov. 15, 2019 as a PCT International Patent Application and claims the benefit of U.S. Patent Application Ser. No. 62/768,594, filed on Nov. 16, 2018, the disclosure of which is incorporated herein by reference in its entirety.

BACKGROUND

Fiber optic communication systems deliver high bandwidth communication capabilities (e.g., data and voice) to customers. Fiber optic communication systems employ a network of fiber optic cables to transmit large volumes of data and voice signals over relatively long distances. Optical fiber connectors are used in most fiber optic communication systems. Fiber optic connectors allow two optical fibers to be quickly, optically connected without requiring a splice. Fiber optic connectors can be used to optically interconnect two lengths of optical fiber. Optical fiber connectors can also be used to interconnect lengths of optical fiber to passive and active equipment.

Lengths of connectorized optical fibers are often bundled together, e.g., placed in a common conduit. Towards the connectors, i.e., towards the ends of the bundled fibers, the optical fibers are broken out at a cable breakout into multiple cables, e.g., pigtails, so that their connectors and corresponding fibers can be routed to the appropriate receptacles, e.g., the appropriate adapters in a telecommunications cabinet, closure, patch panel, or other data distribution locations.

Such data distribution locations often handle large amounts of data, e.g., data for a large number of network subscribers. Consequently, such data distribution locations frequently contain a very many number of optical cables, including connectorized fibers actively or passively connected at both ends. Over time, equipment fails or needs to be updated, requiring some of the fibers at a given data distribution location to be decommissioned and disconnected so that the disconnected fibers, or the equipment the disconnected fibers are attached to, can be replaced, updated, and/or otherwise maintained.

Due to the high density of fibers and cables in these areas, identifying the distal end of a given cable that needs to be disconnected and whose proximal end has been identified can present a significant challenge for the technician performing the disconnections. For example, a technician identifies a proximal end (the end adjacent to the technician) of a cable whose distal end (i.e., the remote end of the cable) needs to be disconnected. Tracking the cable from the adjacent end to the remote end in order to perform the disconnection at the remote end can present a significant challenge, particularly in high cable density locations.

Providing an optical cable with a visual tracing element is known. Example tracing solutions for optical cables are described, for example, in U.S. Pat. No. 5,305,405, the contents of which are hereby fully incorporated by reference.

There is a need for improvements in end to end visual tracing of optical cables.

SUMMARY

In general terms, the present disclosure is directed to a cable assembly that includes a tracer component. A tracing signal is input or initiated at or near a proximal end of the tracer component. The tracing signal propagates along a tracing conduit causing activation of an indicator at or near a distal end of the tracer component. The tracer component is coupled to one or more cables, and thereby acts as a tracer for the one or more cables to which it is coupled.

In some examples, the tracing conduit is an electrical conductor, e.g., one or more copper or other electrically conducting wires. In some examples, the tracing conduit is an optical conductor, e.g., one or more glass or plastic optical fibers that conduct optical signals, e.g., visual light.

In some examples, the tracing signal is an electrical signal. In some examples, the tracing signal is an optical signal, e.g., laser or non-laser light.

In some examples, the indicator is a visual indicator, i.e., an indicator that can be seen by the human eye, such as a diffused or glowing visible laser light, or an electrically powered light emitter, such as a light emitting diode. In some examples, the indicator is otherwise observable. For example, the indicator can be an audible sound or a vibration that can be felt.

In some examples, a visual fault locator (VFL) is used to introduce the tracing signal to the tracer component.

In some examples, an electrical power source (e.g., a battery) is used to introduce the tracing signal to the tracer component.

In some examples, the tracer component includes a non-conductive jacket radially surrounding the conductor, the conductor extending axially from the proximal end to the distal end of the tracer component.

In some examples, the one or more cables to which the tracer component is coupled include one or more optical cables, i.e., cables containing one or more optical fibers. In some examples, the one or more cables to which the tracer component is coupled include one or more electrical cables, i.e., cables containing one or more electrical wires. In some examples, the one or more cables to which the tracer component is coupled include one or more hybrid cables, i.e., cables containing one or more optical fibers and one or more electrical wires.

According to certain aspects of the present disclosure, a cable assembly comprises: at least one transmission conduit having a first axial length extending along an axis of the transmission conduit from a first proximal end to a first distal end of the transmission conduit, the transmission conduit including a first proximal portion, a first distal portion, and a first middle portion positioned between the first proximal portion and the first distal portion, the first distal portion extending distally from a breakout location to the first distal end of the transmission conduit; a tracer component comprising a tracer conduit having a second axial length extending along an axis of the tracer conduit from a second proximal end to a second distal end of the tracer conduit, the tracer conduit being adapted to carry a tracer signal from the second proximal end to the second distal end, the tracer conduit including a second proximal portion, a second distal portion, and a second middle portion positioned between the second proximal portion and the second distal portion, the second distal portion extending distally from the breakout location to the second distal end of the tracer conduit, an axial length of the second distal portion being different than an axial length of the first distal portion; and a sleeve radially surrounding and holding the first and second distal portions within a predefined radial distance of each other.

According to further aspects of the present disclosure, a cable assembly comprises: at least one transmission conduit extending axially from a proximal end to a distal end of the transmission conduit, the proximal and distal ends of the at least one transmission conduit being adapted for connection to first and second telecommunications equipment, respectively; a tracer conduit extending axially from a proximal end to a distal end of the tracer conduit, the proximal and distal ends of the tracer conduit not being adapted for connection to the first and second telecommunications equipment; and a sleeve radially surrounding and holding portions of the at least one transmission conduit and the tracer conduit within a predefined radial distance of each other.

According to further aspects of the present disclosure, a cable assembly comprises: an odd number of conduits including at least one pair of transmission conduits and a single tracer conduit; and a sleeve radially surrounding and holding portions of the at least one pair of transmission conduits and the single tracer conduit within a predefined radial distance of each other. In some examples, the at least one pair of transmission conduits comprises at least 2 pairs, at least 4 pairs, at least 8 pairs, at least 12 pairs, or at least 16 pairs of transmission conduits. In some examples, the transmission conduits and the tracer conduit are optical fibers.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the examples disclosed herein are based.

DETAILED DESCRIPTION

Figure 1:
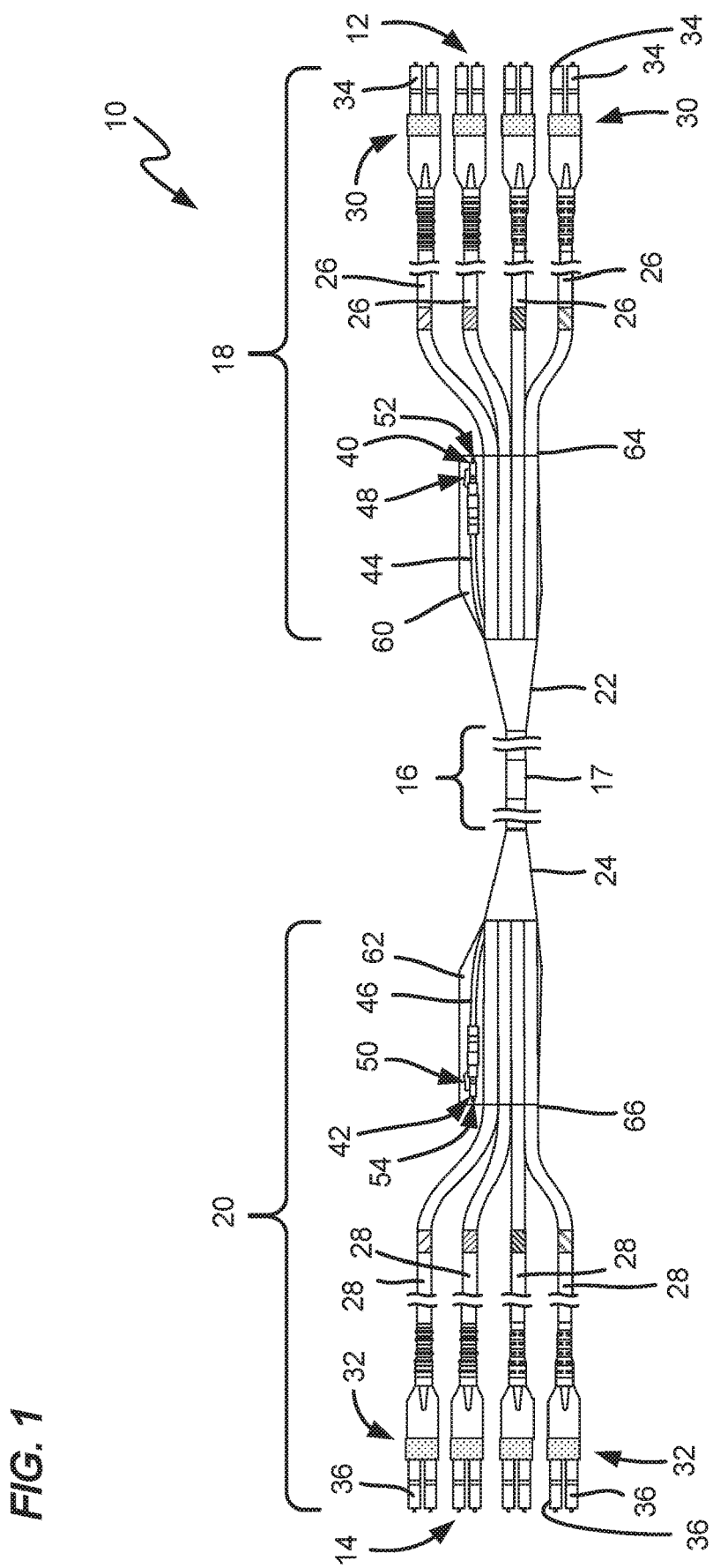
FIG. 1 is a schematic representation of a cable assembly according to the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The features in the drawings are not necessarily drawn to scale.

Referring to FIG. 1, an example cable assembly 10 is schematically depicted. In this example, the cable assembly 10 includes optical fibers adapted to transmit optical signals. In other examples, the cable assembly can be configured to transmit other types of signals, such as electrical signals.

The cable assembly 10 generally extends from a proximal end 12 to a distal end 14.

The cable assembly 10 includes a non-breakout section 16 and two breakout sections 18, 20, positioned proximally and distally, respectively, from the non-breakout section 16. The non-breakout section 16 includes a common jacket 17 that radially surrounds all of the optical fibers of the cable assembly 10. It should be appreciated however, that the optical fibers can be fixedly coupled to one another in any suitable fashion in the non-breakout section 16, such as multiple jacketed fibers whose jackets are fused or otherwise fixedly attached to one another.

Cable breakout components or breakouts 22, 24 provide transitions from the non-breakout section 16 to the two breakout sections 18, 20. Optical fibers extending from the non-breakout section 16 enter the breakouts 22, 24 and into individually jacketed physically separable pigtails 26, 28 that are coupled to the breakouts 22, 24. In this example, each of the pigtails 26, 28 carries two optical fibers that are terminated at duplex optical connectors 30, 32. It should be appreciated that the pigtails 26, 28 can carry any suitable number of optical fibers and can be terminated in any suitable fashion, e.g., with or without connectors, the terminations enabling the optical fibers to be actively or passively connected to telecommunications equipment at a data distribution location. If optical fibers of the pigtails 26, 28 are terminated at connectors, the connectors can be of any suitable form factor, such as SC, LC, MPO, etc. In the example cable assembly 10, the connector bodies 34, 36 are of LC form factor.

An axial length of the non-breakout section 16 can be in a range anywhere from a few inches (e.g., 6 inches or less) to hundreds or thousands of feet (e.g., 1,000 feet or more).

Heat shrink material or another coupling structure secures the breakouts 22, 24 to the non-breakout section 16 and the pigtails 26. As used herein, heat shrink material refers to materials that shrink due to an increase or decrease in heat of the material.

The cable assembly 10 also includes a tracer component. The tracer component includes a dedicated tracer signal conduit that is in addition to the optical fibers of the pigtails 26, 28. In this example, the tracer signal conduit is a single optical fiber, although in other examples, different configurations of tracer signal conduits (e.g., an electrical wire, multiple fibers or wires, etc.) can be used. The tracer optical fiber extends along an axis from a proximal end 40 to a distal end 42. A central portion of the tracer optical fiber is radially surrounded by the common jacket 17.

A proximal portion of the tracer optical fiber extends proximally from the breakout 22 into a dedicated individually jacketed tracer pigtail 44 that is physically separable from the pigtails 26. Similarly, a distal portion of the tracer optical fiber extends distally from the breakout 24 into a dedicated individually jacketed tracer pigtail 46.

The proximal end of the tracer pigtail 44 is connectorized with a connector 48 that proximally terminates the tracer optical fiber. Similarly, the distal end of the tracer pigtail 46 is connectorized with a connector 50 that distally terminates the tracer optical fiber. That is, the connectors 48, 50 form part of the tracer pigtails 44, 46, respectively. The connectors 48, 50 can be any suitable form factor. In the example shown, the connectors 48, 50 are LC connectors having ferrules 52, 54 at which the ends of the tracer optical fiber are terminated.

Alternatively, one or both ends of the tracer optical fiber need not be terminated at connectors at all, but rather at any suitable component adapted to provide an indication of a tracer signal that has propagated long the length of the tracer optical fiber. For example, the one or both ends of the tracer optical fiber can be terminated at a ferrule alone, and without any additional connector structure.

As depicted in FIG. 1, the axial length of the tracer optical fiber between the proximal and distal ends 40, 42 is shorter than the axial lengths of the fibers terminated at the connectors 30, 32. In addition, the tracer pigtail 44 does not extend proximally from the breakout 22 as far as any of the pigtails 26, and the tracer pigtail 46 does not extend distally from the breakout 24 as far as any of the pigtails 28. In some examples, the axial length of the tracer pigtails 44, 46 is at least 0.5 inches, at least 1 inch, at least 2 inches, at least 6 inches, or at least 12 inches shorter than the axial lengths of the pigtails 26, 28, respectively. In some examples, the axial length of the tracer pigtails 44, 46 is in a range from about 2 inches to about 10 inches. In some examples, the axial length of tracer pigtails 44, 46 is in a range from about 4 inches to about 8 inches. In some examples, the axial length of the tracer pigtails 44, 46 is about 6 inches.

Thus, the tracer pigtails 44, 46 can be readily identified and distinguished from the regular data transmission pigtails 26, 28. This can be beneficial by, for example, minimizing the chances of a technician attempting to connect the tracer optical fiber to the telecommunications equipment intended for the data transmission pigtails 26, 28.

However, due to the relative axial shortness of the tracer pigtails 44, 46, and physical separability of the tracer pigtails 44, 46 from the data transmission pigtails 26, 28, there can be a tendency for the tracer pigtails 44, 46 to become caught or snagged on other cables or telecommunications equipment, particularly in a cable-dense data distribution location with large numbers of cables. For example, when attempting to connect the data transmission pigtails to active or passive telecommunications equipment, the tracer pigtail can become caught on other cables or equipment while advancing the data transmission pigtails between or around cables and other equipment. Such snagging can damage the cable assembly 10 or other cables and equipment in the vicinity.

To minimize snagging of the tracer pigtails 44, 46, sleeves 60, 62 are provided. The sleeve 60 radially surrounds the tracer pigtail 44 and the data transmission pigtails 26, holding the tracer pigtail 44 in physical proximity to the data transmission pigtails 26. The sleeve 62 radially surrounds the tracer pigtail 46 and the data transmission pigtails 28, holding the tracer pigtail 46 in physical proximity to the data transmission pigtails 28. In this manner, physical separation of the tracer pigtails 44, 46 from at least one (or all) of their corresponding data transmission pigtails 26, 28 is minimized, e.g., reduced to a predefined maximum radial separation distance (e.g., less than 0.5 inches or less than 0.1 inches of radial separation), or eliminated, i.e., the sleeve 60, 62 causes the tracer pigtail 44, 46 to be in physical contact with at least one of the corresponding data transmission pigtails 26, 28.

In the example shown, the sleeve 60 is distally fixed in place e.g., with a piece of adhesive tape or heat shrink material, to the breakout 22 or to a piece of heat shrink material that axially fixes the breakout 22. Similarly, the sleeve 62 is proximally fixed in place, e.g., with a piece of adhesive tape or heat shrink material, to the breakout 24 or to a piece of heat shrink material that axially fixes the breakout 24.

In some examples, as shown in FIG. 1, the sleeve 60 is sized such that its proximal end 64 extends or is extendable to be proximally at least as far as, or farther than, the proximal end 40 of the tracer optical fiber. Similarly, the sleeve 62 is sized such that its distal end 66 extends or is extendable to be distally at least as far as, or farther than, the distal end 42 of the tracer optical fiber. In alternative examples, the sleeves 60, 62 need not extend as far as the respective ends 40, 42 of the tracer optical fiber.

It should be appreciated that the terms proximal and distal are used herein for convenience only. Tracing can be performed in either direction (proximal to distal, distal to proximal) for a given cable assembly, including the cable assembly 10. In at least some examples, the tracing capabilities of the cable assembly 10 are essentially equivalent whether sending a tracing signal from the proximal side to the distal side or from the distal side to the proximal side. As described in more detail below, a tracer signal generator is coupled to a tracer optical fiber at the appropriate side (proximal or distal) causing activation of a tracer indicator at the opposite end of the tracer optical fiber.

In alternative embodiments, other couplers instead of, or in addition to, the sleeve 60, 62 can be used to hold the tracer pigtail and corresponding data transmission pigtail(s) in close physical proximity. For example, one or more ties or bands appropriately positioned axially and radially surrounding the tracer pigtail and the data transmission pigtail(s) can be used for this purpose.

Figure 2:
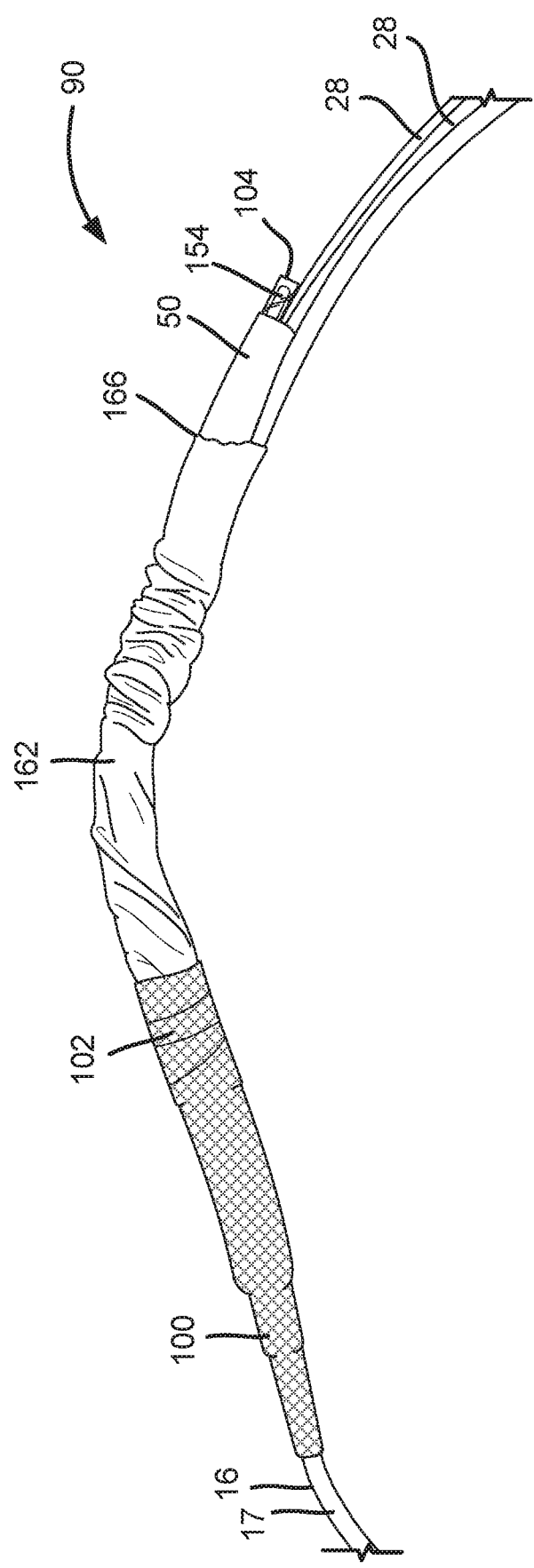
FIG. 2 is a perspective view of a portion of an embodiment of a cable assembly according to the present disclosure.

FIG. 2 shows a portion 90 of a cable assembly in accordance with the present disclosure. The following description will describe the portion 90 with reference to distally positioned components and features. However, it should be appreciated that the following description can equally apply to like proximally positioned components and features. The assembly includes the non-breakout section 16 with jacket 17 as described above. The non-breakout section 16 enters a cable breakout that is secured and radially surrounded by a piece of heat shrink material 100. Data transmission pigtails 28 extend distally from the breakout.

A tracer optical fiber is terminated at an LC connector 50 having a ferrule 154. Optionally, a transparent or translucent dust cap 104 is secured over the distal end of the ferrule 154. Alternatively, there is no dust cap coupled to the ferrule 154.

In some examples, the ferrule 154 is transparent or translucent, allowing radial diffusion of visible light exiting the tracer fiber. Additionally or alternatively, in some examples the body of the connector 50 is transparent or translucent, allowing radial diffusion of visible light exiting the tracer fiber.

A sleeve 162 has a distal end 166 and radially surrounds data transmission pigtails 28 and the tracer pigtail. A proximal end portion of the sleeve 162 is axially fixed with an adhesive tape 102 (or, optionally, a heat shrink material or other fastener, e.g., an elastic band).

The sleeve 162 is collapsible and expandable multiple times. For example, it can be axially expanded to extend up to or beyond the dust cap 104, and it can be axially collapsed to expose a portion or the entirety of the connector 50. In the position shown in FIG. 2, the sleeve 162 is partially axially collapsed, exposing a distal portion of the connector 50. Exposing the distal end of the connector 50 allows a tracer signal generator to be coupled to the distal end of the tracer optical fiber.

The sleeve 162 is also elastically radially expandable multiples times and is sized and configured to apply enough radial force to radially hold together the tracer pigtails and the data transmission pigtails 28, while still providing enough flexibility to axially slide the sleeve 162 on and off the connector 50.

In at least some examples the sleeve 162 is transparent (i.e., clear) or translucent (i.e., not opaque), allowing visible light (such as visible laser light) exiting the distal end of the tracer fiber to pass through and/or diffuse radially outward such that the diffused light is visible on the outside surface of the sleeve 162.

In some examples, the sleeve 162 includes a woven material. In some examples, the sleeve 162 includes nylon. In some examples, the sleeve 162 includes a polyurethane fabric.

Figure 3:
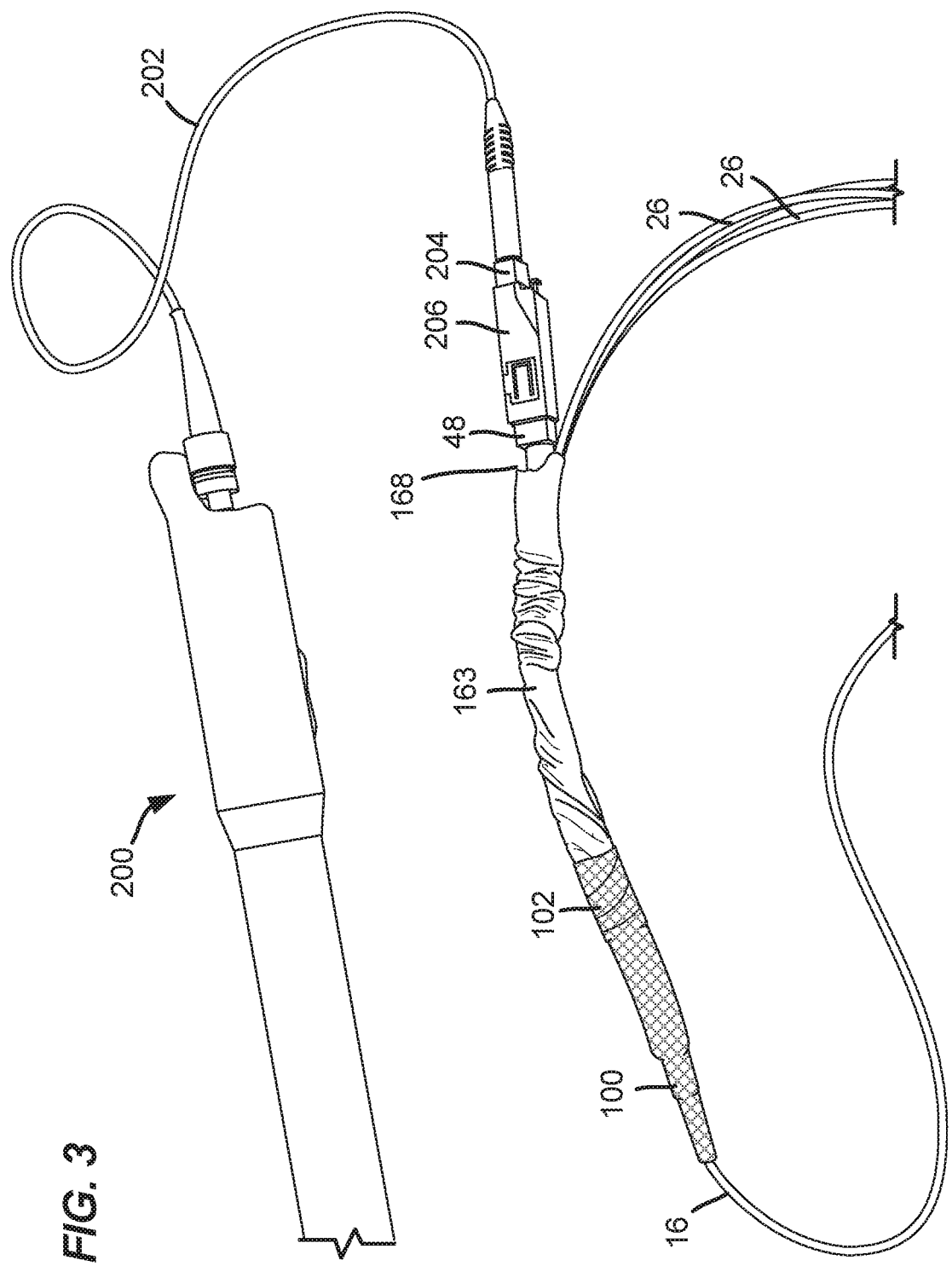
FIG. 3 is a perspective view of a further portion of the cable assembly of FIG. 2 coupled to a tracer signal generator.

Referring now to FIG. 3, the sleeve 163 is identical to the sleeve 162 (FIG. 2) but fixed by a coupling 102 at a distal end and extending proximally to a proximal end 168 such that it surrounds the data transmission pigtails 26 and tracer pigtail 44 (FIG. 1) terminated at the connecter 48. However, it should be appreciated that the following description can equally apply to like distally positioned components and features. The sleeve 163 has been axially pulled back to expose the connector 48.

A tracer signal generator 200 is provided. In this example, the tracer signal generator 200 includes an integral power source and is configured to provide laser light or pulses of laser light. For example, the tracer signal generator 200 can be a visual fault locator. A jumper cable 202 is connected at one end to the tracer signal generator 200 and at the other end to a connector 204. The connector 204 is optically connected to the tracer optical fiber of the connector 48 (with dust cap removed from the ferrule of the connector 48) via an adapter 206. In this manner, laser light propagates from the signal generator 200 along the jumper cable 202 and into the tracer optical fiber via the proximal end 40 (FIG. 1) of the tracer optical fiber and to the distal end of 42 of the tracer optical fiber where it can be observed after exiting the tracer optical fiber.

Figure 4:
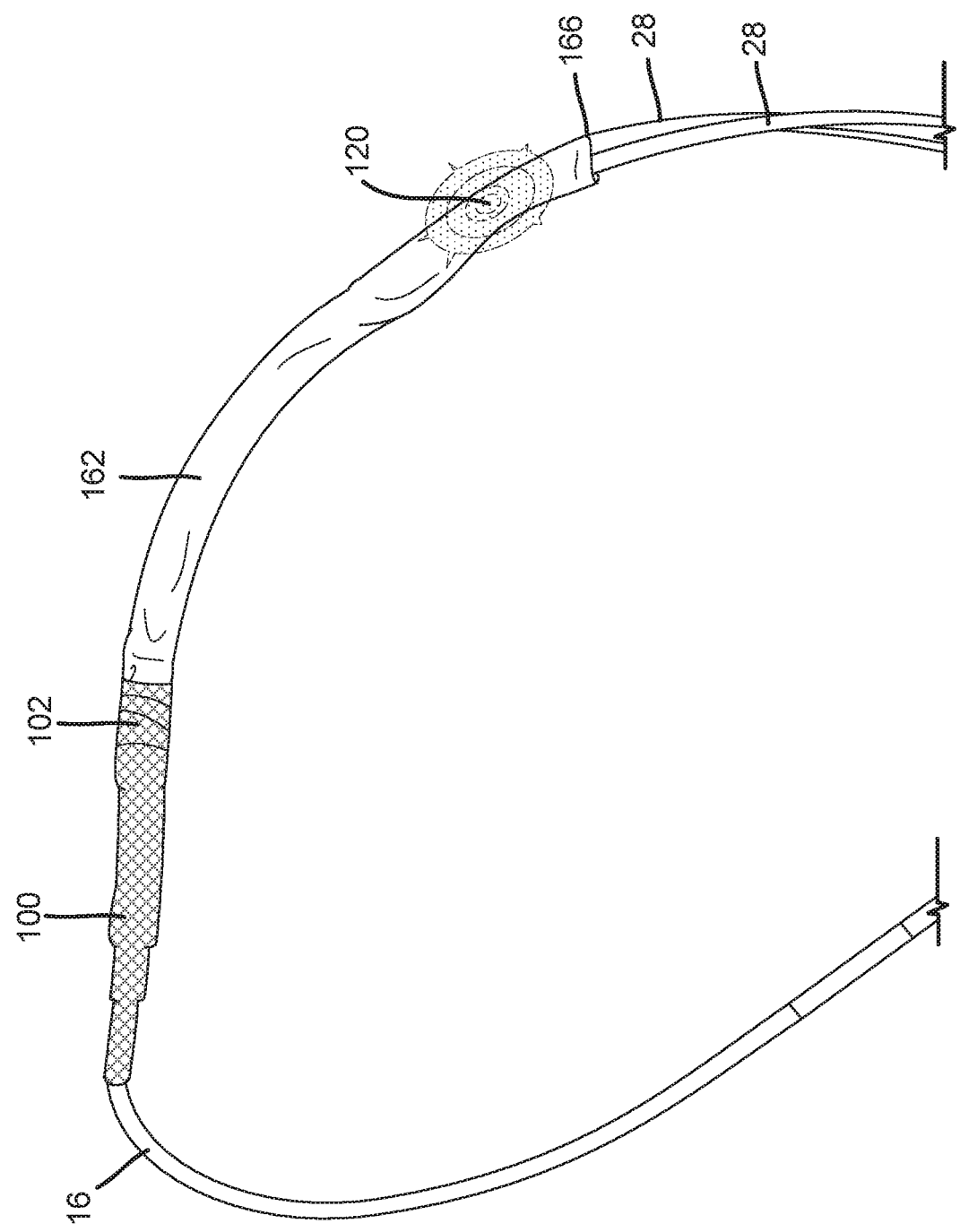
FIG. 4 is a perspective view of a further portion of the cable assembly of FIG. 2, with a tracer indicator activated.

Referring now to FIG. 4, the distal portion of the cable assembly of FIG. 3 is shown, with a tracer signal being actively provided by the signal generator 200 (FIG. 3) and distally propagated down the tracer optical fiber. The sleeve 162 is radially surrounding the entirety of the tracer pigtail 46 (FIG. 1) and holding the tracer pigtail 46 in radially physical proximity to the pigtails 28.

In this example, the tracer signal is a laser light that exits the distal end of the tracer optical fiber and radially diffuses through the translucent sleeve 162, such that a portion 120 of the sleeve 162 appears to glow with the laser light, the glow of the portion 120 being visible exteriorly to the cable assembly. In this manner, the distal breakout section of a cable assembly in which a tracer signal is introduced at the proximal breakout section is easily identified. That is, the pigtails 28 can be easily identified for, e.g., purposes of disconnecting such pigtails from telecommunications equipment.

Figure 5:
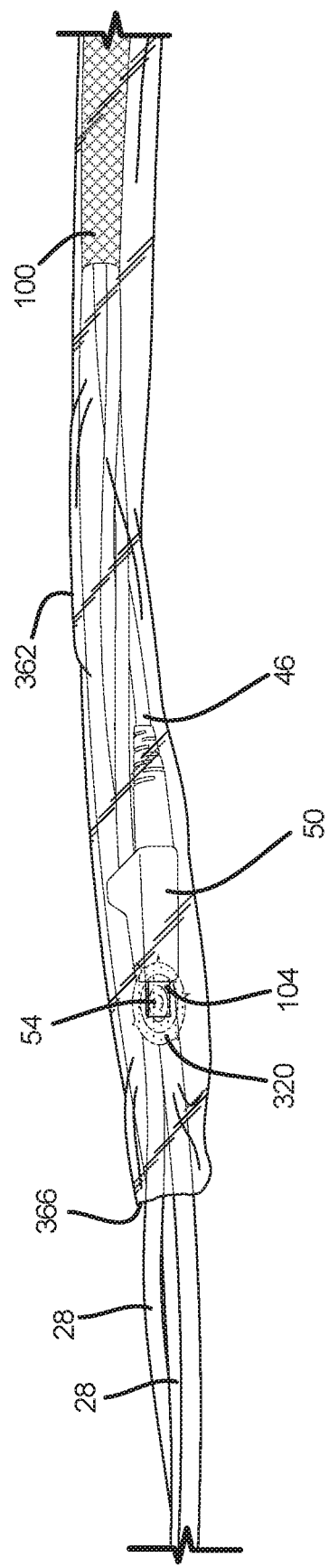
FIG. 5 is a perspective view of a portion of a further embodiment of a cable assembly according to the present disclosure.

Referring now to FIG. 5, a portion of a cable assembly having many features already described is shown. There is an active tracer signal propagating along the tracer optical fiber causing the dust cap 104 to radially diffuse laser light.

In this example, a further embodiment of a sleeve 362 is provided. The sleeve 362 is a piece of heat shrink material that has been heat shrunk around the data transmission pigtails 28 and the entirety of the tracer pigtail 46, extending distally to a distal end 366 that is positioned distally beyond the distal end of the tracer optical fiber that is terminated at the ferrule 54. Once heat shrunk as shown, the sleeve 362 radially holds together the tracer pigtail 46 and the data transmission pigtails 28.

Unlike the sleeve 162, 163 described above, the sleeve 362 is at least substantially clear and not expandable and collapsible multiple times. In addition, the proximal end portion of the sleeve 362 is self-affixed through the heat shrink process to the outside of the heat shrink 100, such that an additional coupler (e.g., the adhesive tape 102 shown in FIG. 2) is not required to axially affix the proximal end portion of the sleeve 362 relative to the fibers. Due to the surface intricacies (folds, creases, curves, etc.) and other properties of the substantially clear sleeve 362, light (e.g., laser light) exiting the distal end of the tracer fiber radially diffuses, forming a glowing region 320 visible exteriorly from the cable assembly, regardless of whether the dust cap 104 is present.

Because the sleeve 362 is not made of a material that is not readily expandable and collapsible multiple times, in order to access the connector 50 for purposes of coupling a tracer signal generator thereto (e.g., for sending a tracer signal to the proximal end of the tracer optical fiber), at least a portion of the sleeve 362 has to be broken and entirely removed from the rest of the cable assembly. That is, the sleeve 362 is effectively a single use sleeve.

It should be appreciated that different embodiments of a sleeve can be provided on the opposing ends of a given cable assembly, e.g., one embodiment of a sleeve provided at the proximal breakout section of the cable assembly, and another embodiment of a sleeve provided at the distal breakout section of the cable assembly.

Figure 6:
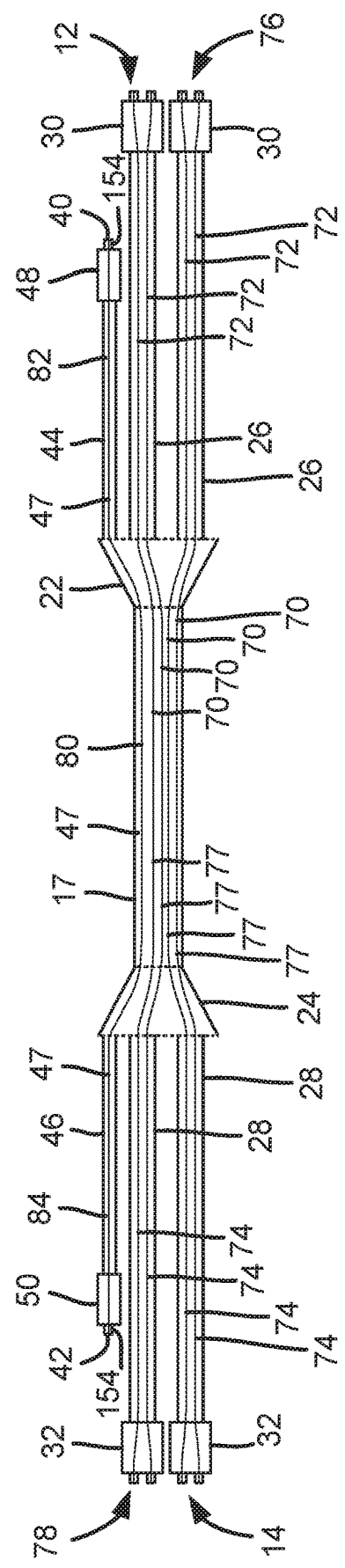
FIG. 6 is a schematic representation of a partial cable assembly in accordance with the present disclosure.

FIG. 6 is a schematic representation of a partial cable assembly in accordance with the present disclosure, shown for ease of illustration without the sleeves described above. Referring to FIG. 6, data transmission conduits 77 extend from proximal ends 76 that are terminated at the ferrules of the connectors 30 to distal ends 78 that are terminated at the ferrules of the connectors 32. The data transmission conduits 77 are optical fibers that include middle portions 70 positioned axially between the two breakouts 22 and 24, proximal portions 72 extending proximally from the breakout 22 to the proximal ends 76, and distal portions 74 extending distally from the breakout 24 to the distal ends 78. The tracer conduit 47 is an optical fiber extending from its proximal end 40 to its distal end 42. The proximal end 40 is terminated at the ferrule 154 of the connector 48. The distal end 42 is terminated at the ferrule 154 of the connector 50. The tracer conduit 47 includes a middle portion 80 positioned axially between the two breakouts 22 and 24, a proximal portion 82 extending proximally from the breakout 22 to the proximal end 40, and a distal portion 84 extending distally from the breakout 24 to the distal end 42.

Example Embodiments

According to a first example embodiment, there is provided a cable assembly comprising: a plurality of transmission conduits having first axial lengths extending along axes of the transmission conduits from first proximal ends to first distal ends of the transmission conduits, the transmission conduits including first proximal portions, first distal portions, and first middle portions positioned between the first proximal portions and the first distal portions, the first proximal portions extending proximally from a first breakout location to the first proximal ends of the transmission conduits, the first distal portions extending distally from a second breakout location to the second proximal ends of the transmission conduits; a tracer conduit having a second axial length extending along an axis of the tracer conduit from a second proximal end to a second distal end of the tracer conduit, the tracer conduit being adapted to carry a tracer signal from the second proximal end to the second distal end and from the second distal end to the second proximal end, the tracer conduit including a second proximal portion, a second distal portion, and a second middle portion positioned between the second proximal portion and the second distal portion, the second proximal portion extending proximally from the first breakout location to the second proximal end of the tracer conduit, the second distal portion extending distally from the second breakout location to the second distal end of the tracer conduit, an axial length of the second proximal portion being different than axial lengths of the first proximal portions, an axial length of the second distal portion being different than axial lengths of the first distal portions; a first sleeve radially surrounding and holding the first proximal portions and the second proximal portion within a predefined first radial distance of each other; and a second sleeve radially surrounding and holding the first distal portions and the second distal portion within a predefined second radial distance of each other.

According to a second example embodiment, there is provided the first example embodiment, wherein the first middle portions and the second middle portion are affixed to each other.

According to a third example embodiment, there is provided the second example embodiment, wherein the first middle portions and the second middle portion share a common outer cable jacket.

According to a fourth example embodiment, there is provided any of the first through third example embodiments, wherein the tracer conduit is a tracer optical fiber.

According to a fifth example embodiment, there is provided any of the first through fourth example embodiments, wherein the first proximal portions include first data transmission pigtails, wherein the first distal portions include second data transmission pigtails, wherein the second proximal portion includes a first tracer pigtail, and wherein the second distal portion includes a second tracer pigtail.

According to a sixth example embodiment, there is provided the fifth example embodiment, wherein the first and second data transmission pigtails include fiber optic connectors that terminate one or more optical fibers of the first and second data transmission pigtails.

According to a seventh example embodiment, there is provided any of the fifth through sixth example embodiments, wherein the first and second tracer pigtails include terminating components that proximally and distally terminate, respectively, the tracer optical fiber.

According to an eighth example embodiment, there is provided the seventh example embodiment, wherein the terminating components include ferrules.

According to a ninth example embodiment there is provided the eight example embodiment, wherein the terminating components include fiber optic connectors having connector bodies that house the ferrules.

According to a tenth example embodiment, there is provided any of the first through ninth example embodiments, wherein the tracer signal is visible laser light.

According to an eleventh example embodiment, there is provided any of the eighth through tenth example embodiments, further comprising transparent or translucent dust caps coupled to the ferrules.

According to a twelfth example embodiment, there is provided any of the eighth through tenth example embodiments, wherein there is no dust cap coupled to at least one, or to either, of the ferrules.

According to a thirteenth example embodiment, there is provided any of the first through twelfth example embodiments, wherein the sleeves comprise material that is transparent or translucent, allowing visible light to pass through the sleeves.

According to a fourteenth example embodiment, there is provided any of the first through twelfth example embodiments, wherein the sleeves comprise material that radially diffuses light exiting the distal and proximal ends of the tracer conduit.

According to a fifteenth example embodiment, there is provided any of the first through fourteenth example embodiments, wherein the first sleeve extends proximally at least as far as, or farther than, the proximal end of the tracer conduit, and wherein the second sleeve extends distally at least as far as, or farther than, the distal end of the tracer conduit.

According to a sixteenth example embodiment, there is provided any of the first through fifteenth example embodiments, wherein at least a distal portion of the first sleeve is axially fixed, and wherein at least a proximal portion of the second sleeve is axially fixed.

According to a seventeenth example embodiment, there is provided the sixteenth example embodiment, wherein the distal portion of the first sleeve is axially affixed at the first breakout location with adhesive tape and wherein the proximal portion of the second sleeve is axially affixed at the second breakout location with adhesive tape.

According to an eighteenth example embodiment, there is provided the sixteenth example embodiment, wherein the distal portion of the first sleeve is axially affixed at the first breakout location with heat shrink material, and wherein the proximal portion of the second sleeve is axially affixed at the second breakout location with heat shrink material.

According to a nineteenth example embodiment, there is provided any of the first through fifteenth example embodiments, wherein the first proximal portions include first data transmission pigtails, wherein the first distal portions include second data transmission pigtails, wherein the second proximal portion includes a first tracer pigtail, and wherein the second distal portion includes a second tracer pigtail, wherein the first sleeve comprises heat shrink material that is heat shrunk to radially surround and hold in physical proximity the first data transmission pigtails and the first tracer pigtail, and wherein the second sleeve comprises heat shrink material that is heat shrunk to radially surround and hold in physical proximity the second data transmission pigtails and the second tracer pigtail.

According to a twentieth example embodiment, there is provided the nineteenth example embodiment, wherein the proximal end of the tracer conduit is accessible by breaking the heat shrink material of the first sleeve, and wherein the distal end of the tracer conduit is accessible by breaking the heat shrink material of the second sleeve.

According to a twenty-first example embodiment, there is provided any of the first through eighteenth example embodiments, wherein the first proximal portions include first data transmission pigtails, wherein the first distal portions include second data transmission pigtails, wherein the second proximal portion includes a first tracer pigtail, wherein the second distal portion includes a second tracer pigtail, and wherein the first and second sleeves are repeatably axially and radially expandable and collapsible.

According to a twenty-second example embodiment, there is provided the twenty-first example embodiment, wherein the first sleeve applies a radially inward force on the first data transmission pigtails and the first tracer pigtail to hold the first data transmission pigtails and the first tracer pigtail in physical proximity to one other, and wherein the second sleeve applies a radially inward force on the second data transmission pigtails and the second tracer pigtail to hold the second data transmission pigtails and the second tracer pigtail in physical proximity to one other.

According to a twenty-third example embodiment, there is provided any of the twenty-first through twenty-second example embodiments, wherein the first and second sleeves comprise woven material.

According to a twenty-fourth example embodiment, there is provided any of the twenty-first through twenty-third example embodiments, wherein the first and second sleeves comprise a polyurethane fabric.

According to a twenty-fifth example embodiment, there is provided any of the twenty-first through twenty-fourth example embodiments, wherein the proximal end of the tracer conduit is accessible by axially collapsing the first sleeve such that the proximal end of the first sleeve is slid in a distal direction, and wherein the distal end of the tracer conduit is accessible by axially collapsing the second sleeve such that the distal end of the second sleeve is slid in a proximal direction.

According to a twenty-sixth example embodiment, there is provided a system including any cable assembly disclosed herein, including but not limited to the cable assembly of any of the first through twenty-fifth example embodiments, and further comprising a tracer signal generator.

According to a twenty-seventh example embodiment, there is provided the twenty-sixth example embodiment, wherein the tracer signal generator generates visible laser light.

According to a twenty-eighth example embodiment, there is provided the twenty-seventh example embodiment, wherein the tracer signal generator comprises a visual fault locator.

According to a twenty-ninth example embodiment, there is provided a method, comprising: providing a cable assembly according to any of the first through twenty-fifth example embodiments; axially collapsing the first sleeve by distally sliding a proximal end of the first sleeve; optionally, removing a dust cap from the proximal end of the tracer conduit; operably connecting a tracer signal generator to the proximal end of the tracer conduit; transmitting, using the tracer signal generator, a tracer signal axially along the tracer conduit from the proximal end to the distal end of the tracer conduit; and observing the tracer signal after the tracer signal exits the distal end of the tracer conduit and passes through the second sleeve.

According to a thirtieth example embodiment, there is provided a method comprising: providing a cable assembly according to any of the first through twenty-fifth example embodiments; breaking and removing at least a portion of the first sleeve; optionally, removing a dust cap from the proximal end of the tracer conduit; operably connecting a tracer signal generator to the proximal end of the tracer conduit; transmitting, using the tracer signal generator, a tracer signal axially along the tracer conduit from the proximal end to the distal end of the tracer conduit; and observing the tracer signal after the tracer signal exits the distal end of the tracer conduit and passes through the second sleeve.

According to a thirty-first example embodiment, there is provided the thirtieth example embodiment, wherein there is an even number of the transmission conduits.

According to a thirty-second example embodiment, there is provided any of the first through thirty-first example embodiments, wherein the axial length of the second proximal portion is shorter than the axial lengths of the first proximal portions, and the axial length of the second distal portion is shorter than the axial lengths of the first distal portions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A cable assembly, comprising:
   at least one transmission conduit having a first axial length extending along an axis of the transmission conduit from a first proximal end to a first distal end of the at least one transmission conduit, the at least one transmission conduit including a first proximal portion, a first distal portion, and a first middle portion positioned between the first proximal portion and the first distal portion, the first distal portion extending distally from a breakout location to the first distal end of the at least one transmission conduit;
   a tracer conduit having a second axial length extending along an axis of the tracer conduit from a second proximal end to a second distal end of the tracer conduit, the tracer conduit being adapted to carry a tracer signal from the second proximal end to the second distal end, the tracer conduit including a second proximal portion, a second distal portion, and a second middle portion positioned between the second proximal portion and the second distal portion, the second distal portion extending distally from the breakout location to the second distal end of the tracer conduit, an axial length of the second distal portion being different than an axial length of the first distal portion; and
   a sleeve radially surrounding and holding the first and second distal portions within a predefined radial distance of each other,
   wherein the sleeve extends distally at least as far as the distal end of the tracer conduit; and
   wherein the sleeve comprises material that is transparent or translucent, allowing visible light to pass through the sleeve.

2. The cable assembly of claim 1, wherein the first and second middle portions are affixed to each other.

3. The cable assembly of claim 2, wherein the first and second middle portions share a common outer cable jacket.

4. The cable assembly of claim 1, wherein the tracer conduit is a tracer optical fiber.

5. The cable assembly of claim 1,
   wherein the first distal portion includes a data transmission pigtail, and wherein the second distal portion includes a tracer pigtail; and
   wherein the data transmission pigtail includes a fiber optic connector that terminates one or more optical fibers of the data transmission pigtail.

6. The cable assembly of claim 5,
   wherein the tracer pigtail includes a terminating component that distally terminates the tracer optical fiber; and
   wherein the terminating component includes a ferrule.

7. The cable assembly of claim 6, wherein the terminating component includes a fiber optic connector having a connector body that houses the ferrule.

8. The cable assembly of claim 1, wherein the tracer signal is visible laser light.

9. The cable assembly of claim 6, further comprising a transparent or translucent dust cap coupled to the ferrule.

10. The cable assembly of claim 6, wherein there is no dust cap coupled to the ferrule.

11. The cable assembly of claim 1, wherein the sleeve comprises material that radially diffuses light exiting the distal end of the tracer conduit.

12. The cable assembly of claim 1, wherein at least a proximal portion of the sleeve is axially fixed.

13. The cable assembly of claim 12, wherein the proximal portion of the sleeve is axially affixed at the breakout location with adhesive tape or heat shrink material.

14. The cable assembly of claim 1,
wherein the first distal portion includes a data transmission pigtail, wherein the second distal portion includes a tracer pigtail, and wherein the sleeve comprises heat shrink material that is heat shrunk to radially surround and hold in physical proximity the data transmission pigtail and the tracer pigtail; and
wherein the distal end of the tracer conduit is accessible by breaking the heat shrink material.

15. The cable assembly of claim 1,
wherein the first distal portion includes a data transmission pigtail;
wherein the second distal portion includes a tracer pigtail;
wherein the sleeve is repeatably axially and radially expandable and collapsible; and
wherein the sleeve applies a radially inward force on the data transmission pigtail and the tracer pigtail to hold the data transmission pigtail and the tracer pigtail in physical proximity to each other.

16. The cable assembly of claim 15,
wherein the sleeve comprises a woven material and/or a polyurethane fabric; and
wherein the distal end of the tracer conduit is accessible by axially collapsing the sleeve such that the distal end of the sleeve is slid in a proximal direction.

17. The cable assembly of claim 1, wherein the axial length of the second distal portion is shorter than the axial length of the first distal portion.

18. The cable assembly of claim 1, comprising a plurality of the transmission conduits, wherein the sleeve radially surrounds and holds the first distal portions of the plurality of transmission conduits and the second distal portion of the tracer conduit within a predefined radial distance of one another.

19. The cable assembly of claim 1, comprising:
a tracer signal generator configured to generate visible laser light, the tracer signal generator including a visual fault locator.

20. A cable assembly, comprising:
at least one transmission conduit extending axially from a proximal end to a distal end of the transmission conduit, the proximal end and the distal end of the at least one transmission conduit being adapted for connection to first and second telecommunications equipment, respectively;
a tracer conduit extending axially from a proximal end to a distal end of the tracer conduit, the proximal end and the distal end of the tracer conduit not being adapted for connection to the first and second telecommunications equipment; and
a sleeve radially surrounding and holding portions of the at least one transmission conduit and the tracer conduit within a predefined radial distance of each other,
wherein the sleeve extends distally at least as far as the distal end of the tracer conduit; and
wherein the sleeve comprises material that is transparent or translucent, allowing visible light to pass through the sleeve.

21. The cable assembly of claim 20, wherein the transmission conduit and the tracer conduit are optical fibers.

* * * * *

UNITED STATES PATENT AND TRADEMARK OFFICE
CERTIFICATE OF CORRECTION

| | | |
|---|---|---|
| PATENT NO. | : 11,726,281 B2 | Page 1 of 1 |
| APPLICATION NO. | : 17/294208 | |
| DATED | : August 15, 2023 | |
| INVENTOR(S) | : Joseph M. Hynes | |

It is certified that error appears in the above-identified patent and that said Letters Patent is hereby corrected as shown below:

In the Specification

Column 1, Line 6: "This application is being filed on Nov. 15, 2019 as a PCT International Patent Application and claims the benefit of U.S. Patent Application Ser. No. 62/768,594, filed on Nov. 16, 2018, the disclosure of which is incorporated herein by reference in its entirety." should read --This application is a National Stage Application of PCT/US2019/061801, filed on Nov. 15, 2019, which claims the benefit of U.S. Patent Application Ser. No. 62/768,594, filed on Nov. 16, 2018, the disclosures of which is are incorporated herein by reference in their entireties. To the extent appropriate, a claim of priority is made to each of the above disclosed applications.--

Signed and Sealed this
Ninth Day of July, 2024

Katherine Kelly Vidal
*Director of the United States Patent and Trademark Office*